United States Patent Office 3,196,680
Patented July 27, 1965

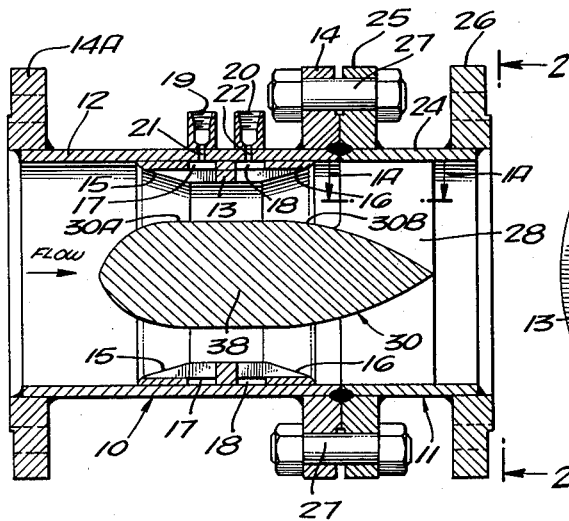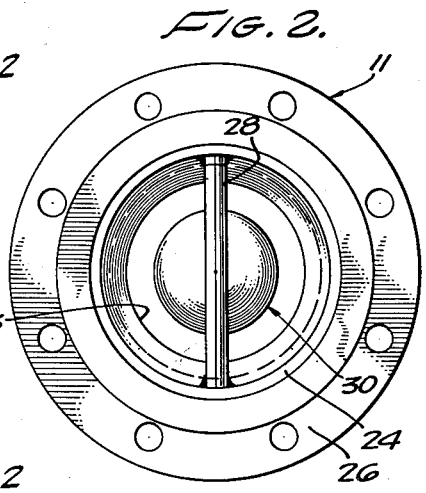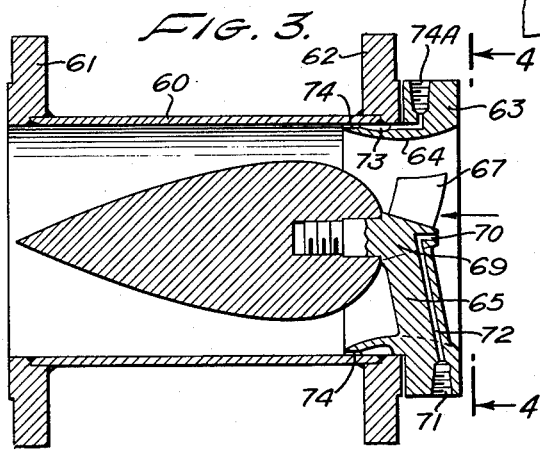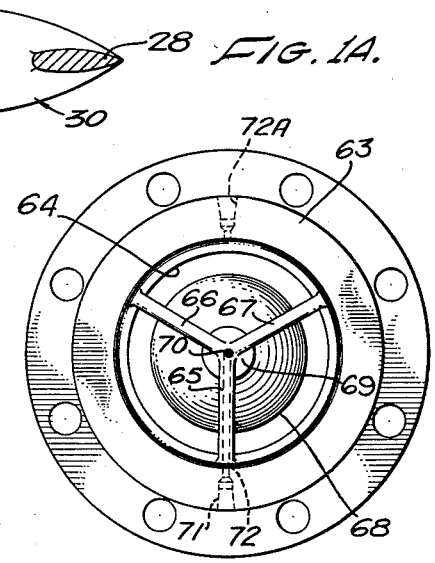

3,196,680
FLOW TUBES
John R. Curran, North Scituate, R.I., assignor to International Telephone and Telegraph Corporation, Baltimore, Md., a corporation of Maryland
Filed Jan. 3, 1962, Ser. No. 163,984
4 Claims. (Cl. 73—213)

The present invention relates to flow tubes adaptable for insertion as a section in a fluid pipeline for determining the velocity and quantity of liquid flowing per unit time in terms of velocity head indications.

Briefly, the flow tubes described herein involve the use of a body disposed coaxially within a pipe to provide a restriction for establishing differential pressures.

In some forms of the invention this body may be provided with pressure-sampling means such as bores, ports or openings and in other forms the same may be used in conjunction with existing flow tube structures wherein the pressure-sampling means are provided in, for example, a throat section on the inner wall of the pipe for modifying the so-called beta ratio of such existing flow tubes.

Using these techniques, flow tubes may be produced quicker, at lower cost, and with greater reproducibility and accuracy, considering particularly the fact that a large variety of patterns and castings are required in fabricating prior art flow tubes which require a variety of restrictions and tube shapes to meet requirements of different installations.

It is not considered practical to standardize on one body casting per size and to provide a variety of restrictions in the form of liners of different thickness, particularly since the material cost of the heavy walled liners in bronze or stainless steel would be prohibitive.

In accordance with one important aspect of the present invention, the restriction is in the form of a streamlined body placed inside of a standardized body which may be made inexpensively. In such case the standardized body is fabricated inexpensively and quickly using standard steel, bronze or stainless steel pipe and using castings only for the streamlined body (restriction) within the standardized pipe body. Since the streamlined body is not a vessel required to contain fluids under pressure, one need not be concerned about porosity and be limited in choice of materials. When, for example, the fluid is an acid, the pipe body may be lined with rubber and the restriction (streamlined body) may be of hard rubber.

It is therefore an object of the present invention to provide improved means and techniques for accomplishing the above-indicated results.

A specific object of the present invention is to provide an improved flow tube characterized by the fact that it incorporates a streamlined, generally ellipsoidally shaped restriction.

Another specific object of the present invention is to provide a structure embodying a suspended streamlined, generally ellipsoidally shaped restriction for use with existing flow tubes to modify their characteristics.

Another object of the present invention is to provide an improved flow tube which is capable of inexpensive and fast production yet attendant, however, with reproducibility and accuracy over a wide range of fluid measurements.

Another specific object of the present invention is to provide a flow tube having a suspended streamlined, generally ellipsoidally shaped restriction therein featured by the fact that the pressure-sensing means are embodied in such restriction.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIGURE 1 is generally a longitudinal sectional view through a construction which is shown and described for explanatory reasons.

FIGURE 1A is a sectional view taken along line 1A—1A in FIGURE 1,

FIGURE 2 is generally an end view of the same taken in the direction indicated by the arrows 2—2 in FIGURE 1.

FIGURE 3 is generally a longitudinal sectional view through a preferred embodiment of a flow tube construction embodying features of the present invention, which features are set forth in the appended claims.

FIGURE 4 is an end view taken generally in the direction indicated by the arrows 6—6 in FIGURE 5.

Referring to the form of the invention shown in FIGURES 1 and 2, the flow tube construction shown therein includes a conventional prior art section 10 sealingly bolted to the section 11 which serves to modify flow characteristics in the section 10.

The section 10 comprises a pipe 12 having flanged terminal ends 14A and 14, the same being suitably apertured for passage of fastening bolts for connection to adjacent pipe sections and includes also an annular restriction 13 mounted on the inner wall of the pipe 12. The restriction 13 is fabricated to provide one or more equally circumferentially spaced upstream pressure-sensing ports or openings 15 which point in the upstream direction and one or more equally circumferentially spaced downstream pressure-sensing ports or openings 16 which point in the downstream direction. Each of these ports 15 and 16, it will be observed, is defined by milled slots in the annular restriction 13. Thus, the upstream and downstream taps are taken at the point of minimum flow cross-sectional area with such taps being adjacent a cylindrical section of body 38, such cylindrical section being between the regions 30A and 30B thereon, i. e. for a distance long enough to make the annulus between the insert 30 and insert 13 carrying the pressure taps to be substantially the same for both the high pressure and low pressure taps.

Each of the pressure-sensing ports 15 is in communication with an annular circumferentially extending opening 17 in the member 13 to serve generally as a manifold. Likewise, each of the ports 16 is in communication with the annular circumferentially extending opening or manifold 18 in the member 13. Threaded pipe connectors or pressure taps 19 and 20 are sealingly affixed on the pipe 12 and are in communication respectively with the manifolds 17 and 18 through corresponding pipe openings 21 and 22 whereby suitable pressure-indicating means may be attached to connector or tap 19 for measuring upstream pressure and to connector or tap 20 for measuring downstream pressure, or for measuring or indicating the differential pressure in manifolds 17 and 18. The pipe section 10 as constructed may have a beta ratio as large as .9. This beta ratio is modified, i.e., lessened, using the section 11 assembled as shown in FIGURE 1.

The section 11 comprises a pipe 24 having flanged terminal ends 25 and 26, the terminal end 25 being sealingly bolted to the terminal section 14 by suitable fastening means such as bolts 27. This pipe 24 has a streamlined web member 28 sealingly affixed internally thereof at diametrically opposite points of the pipe 24 and the same centrally supports, as, for example, by welding thereto, the downstream end of the streamlined, generally ellipsoidally shaped body 30 such that when assembled as illustrated, the longitudinal median axis of the body 30 is coaxial with the axis of pipe 12 and with the portion of body 30 of greatest radial thickness lying centrally within the annular restriction 13. It will be seen that the body 30 as illustrated deviates from an ellipsoid in that the ends of the same are more pointed than would be the case if the body 30 were a true ellipsoid but each section taken through the body 30 in the radial direction comprises a circle.

The streamlined body 30 may be either cast, solid or hollow or could be machined of bar stock, using a contour lathe to shape the same. While this particular arrangement provides more surface area exposed to the fluid than a conventional restriction, it is believed that its geometry flow-wise is more efficient so that less unrecovered head loss may be expected from this particular arrangement, particularly so in view of the streamlined nature of the same.

In the flow tube in FIGURES 3 and 4 the straight pipe section 60, having flanged ends 61 and 62, has secured thereto an annular member 63 which has an inner surface 64 generally arcuate in cross-section to define a restricted throat. This section 63 has extending radially inwardly thereof one or more equally spaced streamlined web members 65, 66 and 67 which support the streamlined, generally ellipsoidally shaped body 68, the same being screw-threadedly mounted on hub member 69 forming a termination of the three web members.

A centrally disposed pressure-sensing port 70 in the hub member is pointed in the direction of fluid flow and is in communication with the high pressure tap 71 via passageway 72 in web member 65.

The low pressure tap 72A is in communication with an annular manifold 73 in member 63 and such manifold is in communication with a plurality of equally circumferentially spaced ports 74 which are pointed in the downstream direction and which are defined in part by adjacent inner wall portions of pipe 60. It is noted also that manifold 73 is likewise defined in part by an annular inner wall portion of pipe 60.

In FIGURE 3 the longitudinal axis of the streamlined, generally ellipsoidally shaped body is coextensive with the longitudinal axis of the pipe or pipe sections in which it is mounted.

Also it will be observed that in each case there are one or more pressure-sensing ports pointing generally in the direction of fluid flow and there are one or more pressure-sensing ports pointing generally in a direction opposite to that of the direction of fluid flow such that conventional differential pressure-measuring apparatus such as, for example, a manometer connected between the two connectors in each embodiment illustrated, reads or indicates generally the sum of two velocity heads from which may be determined the quantity of fluid flow per second. The term "fluid" is used broadly herein and includes both liquid and gaseous mediums.

By placing an insert inside of a conduit, it will be seen that the flow is directed through the annulus or passageway formed between the outer conduit and the insert or obstruction. By streamlining this obstruction, a more uniform pressure is obtained at all parts of the annulus or passageway (measured in a plane perpendicular to the axis of the conduit) and thereby the effect of pressure gradient caused by elbows and valves and the effect of swirl as in the prior art arrangements are greatly minimized. Placing the upstream pressure-sensing connection on the axis of the conduit, as illustrated in FIGURE 3 has the additional advantage of increasing the apparent differential pressure by measuring the total pressure rather than the static pressure and this location tends to decrease errors resulting from various shapes of velocity profiles in the conduit.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. Flow measuring apparatus comprising a conduit, an obstruction mounted in said conduit and spaced from the walls of said conduit and defining a fluid passage with said walls, and pressure-sensing means for sensing pressures in said passage, said conduit comprising two pipe sections, means for securing said pipe sections in alignment with each other, one of said pipe sections having a web member extending inwardly thereof, at least a portion of said fluid-obstructing body being mounted on said web with a major portion thereof extending into the other pipe section, said web member having two pressure ports, one of said pressure ports being in communication with a conduit in said web member which terminates centrally at the upstream end of said obstruction, the other of said ports being in communication with a conduit in said web member which terminates at the wall of said other pipe section and adjacent to said obstruction.

2. Apparatus as set forth in claim 1 in which said conduit is a cylindrical conduit and said obstruction defines a convergent divergent passageway with respect thereto, said pressure-sensing means comprising said one port at the furthermost upstream end of said obstruction and said pressure-sensing means comprising also said other port located at the smallest cross-sectional area of said passage.

3. Apparatus as set forth in claim 1 in which said pressure-sensing means comprises said one port located in said obstruction and at the furthermost upstream end thereof and, said other port extending generally in a downstream direction.

4. Apparatus as set forth in claim 1 in which said obstruction comprises a streamlined body which defines with said conduit a passageway having a convergent and divergent section.

References Cited by the Examiner

UNITED STATES PATENTS

| 790,888 | 5/05 | Ferris | 73—213 X |
| 1,126,275 | 1/14 | Rice | 73—213 |
| 1,143,631 | 6/15 | Keller | 73—213 |
| 2,197,214 | 4/40 | Hollander | 73—213 |
| 2,240,119 | 4/41 | Montgomery | 73—213 |
| 2,439,723 | 4/48 | Engdahl | 73—213 X |

FOREIGN PATENTS

| 554,115 | 6/23 | France. |
| 285,984 | 2/28 | Great Britain. |

RICHARD C. QUEISSER, *Primary Examiner.*

ROBERT EVANS, JOSEPH P. STRIZAK, *Examiners.*